(12) United States Patent
Mandokoro

(10) Patent No.: US 10,047,773 B2
(45) Date of Patent: Aug. 14, 2018

(54) POSITION DETECTING SENSOR OF AN ACTUATOR ACCOMODATED IN A HOUSING

(71) Applicant: SMC CORPORATION, Chiyoda-ku (JP)

(72) Inventor: Jiro Mandokoro, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 16 days.

(21) Appl. No.: 15/352,120

(22) Filed: Nov. 15, 2016

(65) Prior Publication Data

US 2017/0152874 A1 Jun. 1, 2017

(30) Foreign Application Priority Data

Dec. 1, 2015 (JP) ................................. 2015-234540

(51) Int. Cl.
| | |
|---|---|
| *G01D 5/12* | (2006.01) |
| *F15B 19/00* | (2006.01) |
| *F15B 11/08* | (2006.01) |
| *G01D 11/24* | (2006.01) |
| *G01D 11/30* | (2006.01) |
| *F15B 15/28* | (2006.01) |

(52) U.S. Cl.
CPC ............ *F15B 19/005* (2013.01); *F15B 11/08* (2013.01); *F15B 15/2892* (2013.01); *G01D 5/12* (2013.01); *G01D 11/245* (2013.01); *G01D 11/30* (2013.01); *F15B 15/2861* (2013.01); *F15B 2211/857* (2013.01)

(58) Field of Classification Search
CPC ........ G01D 11/30; G01D 5/14; G01D 11/245; G01D 5/12; F15B 11/08; F15B 19/005; F15B 2211/857; F15B 15/2861; F15B 15/2892
USPC ..................................................... 324/207.24
See application file for complete search history.

(56) References Cited

U.S. PATENT DOCUMENTS

| | | | | |
|---|---|---|---|---|
| 7,250,753 | B2 * | 7/2007 | Terasaki | F15B 15/2807 324/207.21 |
| 9,696,186 | B2 * | 7/2017 | Mandokoro | G01D 11/245 |
| 2002/0014128 | A1 * | 2/2002 | Kroll | F15B 15/2807 73/866.5 |
| 2005/0231197 | A1 * | 10/2005 | Reininger | F15B 15/2807 324/251 |
| 2008/0022789 | A1 * | 1/2008 | Okuno | F15B 15/2892 73/866.5 |

(Continued)

FOREIGN PATENT DOCUMENTS

| | | | | |
|---|---|---|---|---|
| DE | 102013011667 A1 * | 1/2015 | | G01D 11/30 |
| JP | 2008-51800 | 3/2008 | | |

*Primary Examiner* — Jay Patidar

(74) *Attorney, Agent, or Firm* — Oblon, McClelland, Maier & Neustadt, L.L.P.

(57) ABSTRACT

A position detecting sensor is mounted in a sensor attachment groove formed in a cylinder device and having a wide portion and a narrow portion. Mounting members each include a mounting member main body positioned in the wide portion having a width dimension larger than a groove width of the narrow portion, and an extension extending from the mounting member main body and positioned in the narrow portion. The housing and the mounting members are connected by connecting bolts, whereby a portion of the cylinder device is retained between the housing and the mounting members.

6 Claims, 6 Drawing Sheets

(56) References Cited

U.S. PATENT DOCUMENTS

2009/0025551 A1* 1/2009 Terasaki .............. F15B 15/2892
　　　　　　　　　　　　　　　　　　　　　　92/5 R

* cited by examiner

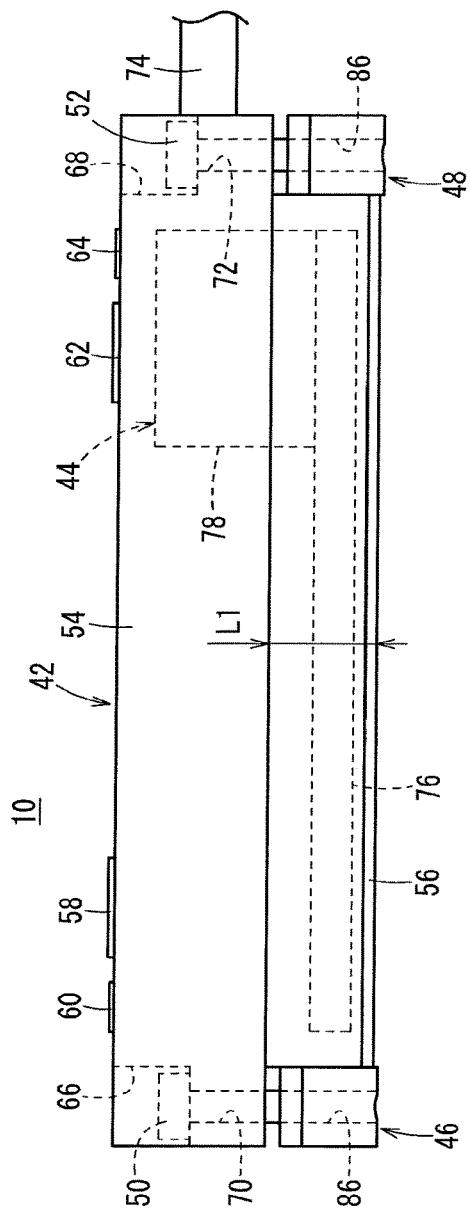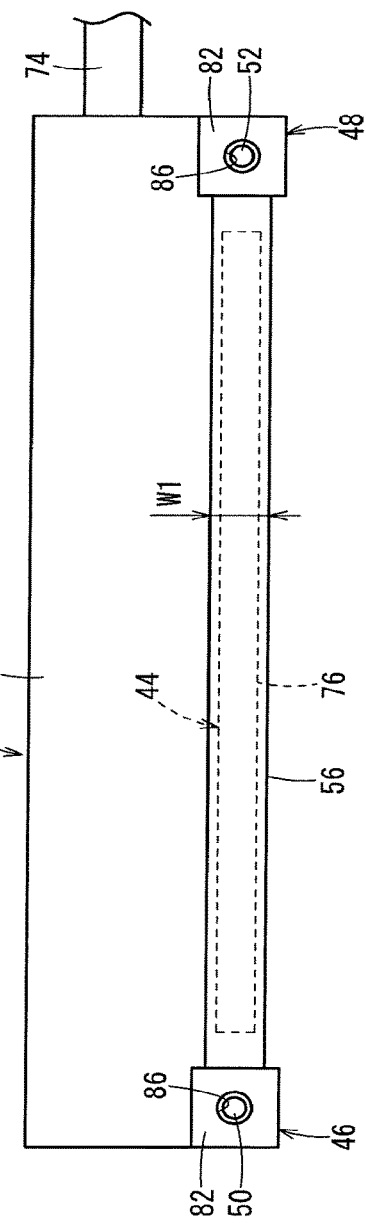
FIG. 3A
FIG. 3B

POSITION DETECTING SENSOR OF AN ACTUATOR ACCOMODATED IN A HOUSING

CROSS-REFERENCE TO RELATED APPLICATION

This application is based upon and claims the benefit of priority from Japanese Patent Application No. 2015-234540 filed on Dec. 1, 2015, the contents of which are incorporated herein by reference.

BACKGROUND OF THE INVENTION

Field of the Invention

The present invention relates to a position detecting sensor which is mounted in a sensor attachment groove that opens on a side surface of an actuator and extends along an axial direction to at least one end surface of the actuator.

Description of the Related Art

Conventionally, for detecting the position of a piston in the interior of a cylinder that constitutes part of an actuator, a magnet is installed on the piston, and a magnetic sensor that detects magnetism from the magnet is arranged on an outer side of the actuator. The piston is reciprocally operated under the supply of a pressure fluid, and the position of the piston is confirmed by magnetism from the magnet that is detected by the magnetic sensor.

In this case, the position detecting sensor is constructed by connecting a cylindrical columnar shaped mounting member to a holder in which the magnetic sensor is accommodated, and by mounting the position detecting sensor in a sensor groove that is circular in cross section and opens along the entire length in an axial direction in a side surface of the cylinder (see, for example, Japanese Laid-Open Patent Publication No. 2008-051800).

When the position detecting sensor is mounted, at first, in a state in which the holder and the mounting member are connected together by a connecting bolt, the mounting member is inserted into the sensor groove from an end surface in the axial direction of the cylinder, and is moved to a predetermined position along the sensor groove. Thereafter, an amount of tightening of the connecting bolt is adjusted, and attachment of the position detecting sensor is completed by a bulging part, which is formed in an opening of the sensor groove, being sandwiched between the holder and the mounting member.

SUMMARY OF THE INVENTION

However, with the position detecting sensor disclosed in Japanese Laid-Open Patent Publication No. 2008-051800, mounting of the position detecting sensor with respect to the cylinder by insertion of the mounting member is performed manually up to a desired position from one end in the axial direction of the cylinder, in a state with the mounting member and the holder being connected together by the connecting bolt. Therefore, an improvement in operational efficiency is not easily achieved, while additionally, constraints are imposed such as requiring a large operating space near the axial end of the cylinder.

The present invention has been devised taking into consideration the aforementioned problems, and has the object of providing a position detecting sensor which enables a mounting operation to be carried out easily and efficiently with respect to an actuator, even in the case that only a comparatively narrow and small operating space is available in the vicinity of an end in the axial direction of the actuator.

For achieving the above object, the position detecting sensor according to the present invention is mounted in a sensor attachment groove that opens on a side surface of an actuator and extends along an axial direction to at least one end surface of the actuator, the sensor attachment groove including a wide portion on a groove bottom surface side, and a narrow portion on a side surface side of the actuator, the position detecting sensor comprising a housing in which there is accommodated a sensor main body that detects a position of a displaceable body of the actuator, a mounting member capable of being inserted into the sensor attachment groove, and a connecting member that connects the housing and the mounting member. The mounting member includes a mounting member main body positioned in the wide portion, and having a width dimension larger than a groove width of the narrow portion, and an extension extending from the mounting member main body and positioned in the narrow portion. The housing and the mounting member are connected by the connecting member, whereby a portion of the actuator is retained between the housing and the mounting member.

In accordance with such a structure, in a state in which the housing and the mounting member are not connected by the connecting member, the mounting member can be inserted into the interior of the sensor attachment groove from an end surface in the axial direction of the actuator, and moved to a predetermined position along the sensor attachment groove. At this time, since the mounting member main body is positioned in the wide portion together with the extension being positioned in the narrow portion, the mounting member can be prevented from rotating inside the sensor attachment groove about an axis parallel with the axis of the actuator. Thereafter, the housing and the mounting member are connected together using the connecting member, whereby the portion of the actuator is retained between the housing and the mounting member. In accordance therewith, the position detecting sensor can be mounted easily and efficiently with respect to an actuator, even in the case that only a comparatively narrow and small operating space is available in the vicinity of an end in the axial direction of the actuator.

In the above-described position detecting sensor, the connecting member may be a bolt, a penetrating hole through which the connecting member is inserted may be formed in the housing, and a threaded hole with which the connecting member is screw-engaged may be formed in the extension.

In accordance with such a structure, the connecting member, which is a bolt, is inserted through the penetrating hole of the housing and is screw-engaged with the threaded hole of the extension, whereby the portion of the actuator can be retained easily between the housing and the mounting member.

In the above-described position detecting sensor, the wide portion and the mounting member, respectively, may be formed with circular shapes as viewed in transverse cross section.

In accordance with such a structure, the mounting member can be prevented from rotating inside the sensor attachment groove about an axis parallel with the axis of the actuator.

In the above-described position detecting sensor, the housing may extend in one direction. Further, two of the mounting members and two of the connecting members may each be provided, and the respective mounting members may be connected by the connecting members respectively to opposite ends in the longitudinal direction of the housing.

In accordance with such a structure, floating up of one end of the housing with respect to the actuator can be suppressed. Therefore, the position detecting sensor can be fixed reliably and stably with respect to the actuator.

In the above-described position detecting sensor, the housing may comprise a housing main body, and a sensor arrangement section provided on the housing main body at a position between the two mounting members, and in which the sensor main body is arranged. The sensor arrangement section may be formed to be insertable into the interior of the sensor attachment groove from the side surface of the actuator, so that the sensor main body is positioned inside the sensor attachment groove.

In accordance with the above configuration, since the sensor main body can be positioned inside the sensor attachment groove, the distance between the displaceable body and the sensor main body can be a relatively close distance. Accordingly, the detection accuracy of the position detecting sensor can be enhanced. Further, since the sensor arrangement section is positioned between the two mounting members, the sensor arrangement section (sensor main body) can be fixed more stably and reliably with respect to the actuator.

According to the present invention, the mounting member can be inserted into the sensor attachment groove from an end in the axial direction of the actuator, in such a manner that the mounting section main body is positioned in the wide portion and the extension is positioned in the narrow portion. In accordance therewith, the position detecting sensor can be mounted easily and efficiently with respect to an actuator, even in the case that only a comparatively narrow and small operating space is available in the vicinity of an end in the axial direction of the actuator.

The above and other objects, features and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3A is a side view of the position detecting sensor of FIG. 2;

FIG. 3B is a rear view of the position detecting sensor of FIG. 2;

DESCRIPTION OF THE PREFERRED EMBODIMENTS

Below, a preferred embodiment concerning a position detecting sensor according to the present invention in relation to a cylinder device on which the positioning detecting sensor is mounted will be described in detail with reference to the accompanying drawings.

Figure 1:
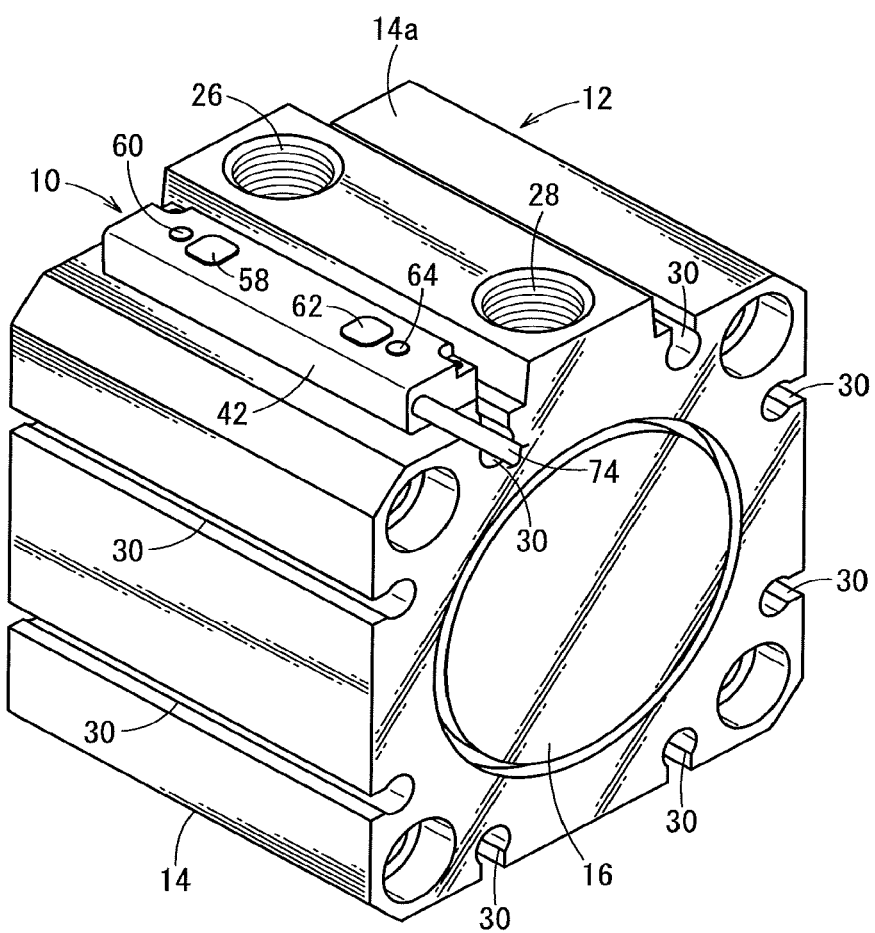
FIG. 1 is a perspective view showing a condition in which a position detecting sensor according to an embodiment of the present invention is mounted on a cylinder device.

At first, the basic configuration of a cylinder device (actuator) 12 will be described. As shown in FIG. 1, the cylinder device 12 is equipped with a metallic cylinder tube 14 formed in a tubular shape, and a pair of end plates 16 that close the openings on ends in the axial direction of the cylinder tube 14.

A non-illustrated piston (displaceable body), which is displaced along the axial direction of the cylinder tube 14 under the supply of a pressure fluid, is disposed in an interior hole of the cylinder tube 14, and a non-illustrated piston rod is connected to the piston. An annular magnet, not shown, is mounted on an outer circumferential surface of the piston.

The cylinder tube 14 includes an outer rectangular shape, and a pair of ports 26, 28 for supplying and discharging a pressure fluid is formed on a side surface 14a of the cylinder tube 14. Two sensor attachment grooves 30 in which the position detecting sensor 10 is mounted are formed in each of the respective side surfaces 14a of the cylinder tube 14.

The respective sensor attachment grooves 30 open on side surfaces 14a of the cylinder tube 14, and extend across the entire length along the axial direction of the cylinder tube 14. Stated otherwise, the respective sensor attachment grooves 30 open on opposite end surfaces of the cylinder tube 14.

Figure 4A:
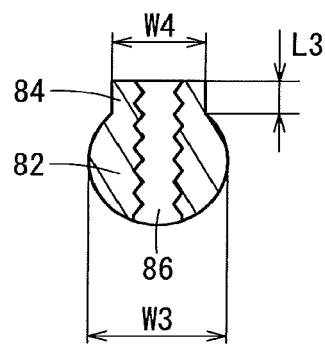
FIG. 4A is an enlarged transverse cross-sectional view of a mounting member.
Figure 4B:
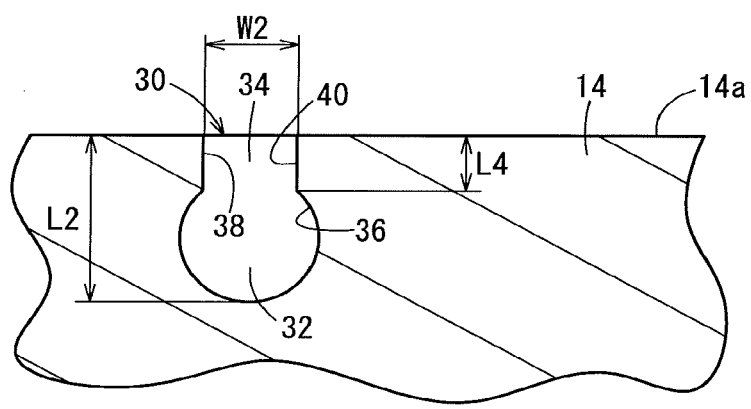
FIG. 4B is a partially enlarged transverse cross-sectional view of a cylinder tube.

As shown in FIG. 4B, the respective sensor attachment grooves 30 each include a wide portion 32 positioned on the side of a groove bottom surface, and a narrow portion 34 positioned on the side of a side surface 14a of the cylinder tube 14. The wide portion 32 is formed with a circular shape in transverse cross section by the arc-shaped curved surface 36. The narrow portion 34 is formed with a rectangular shape in transverse cross section by a pair of confronting planar surfaces 38, 40 connected to the curved surface 36.

Figure 2:
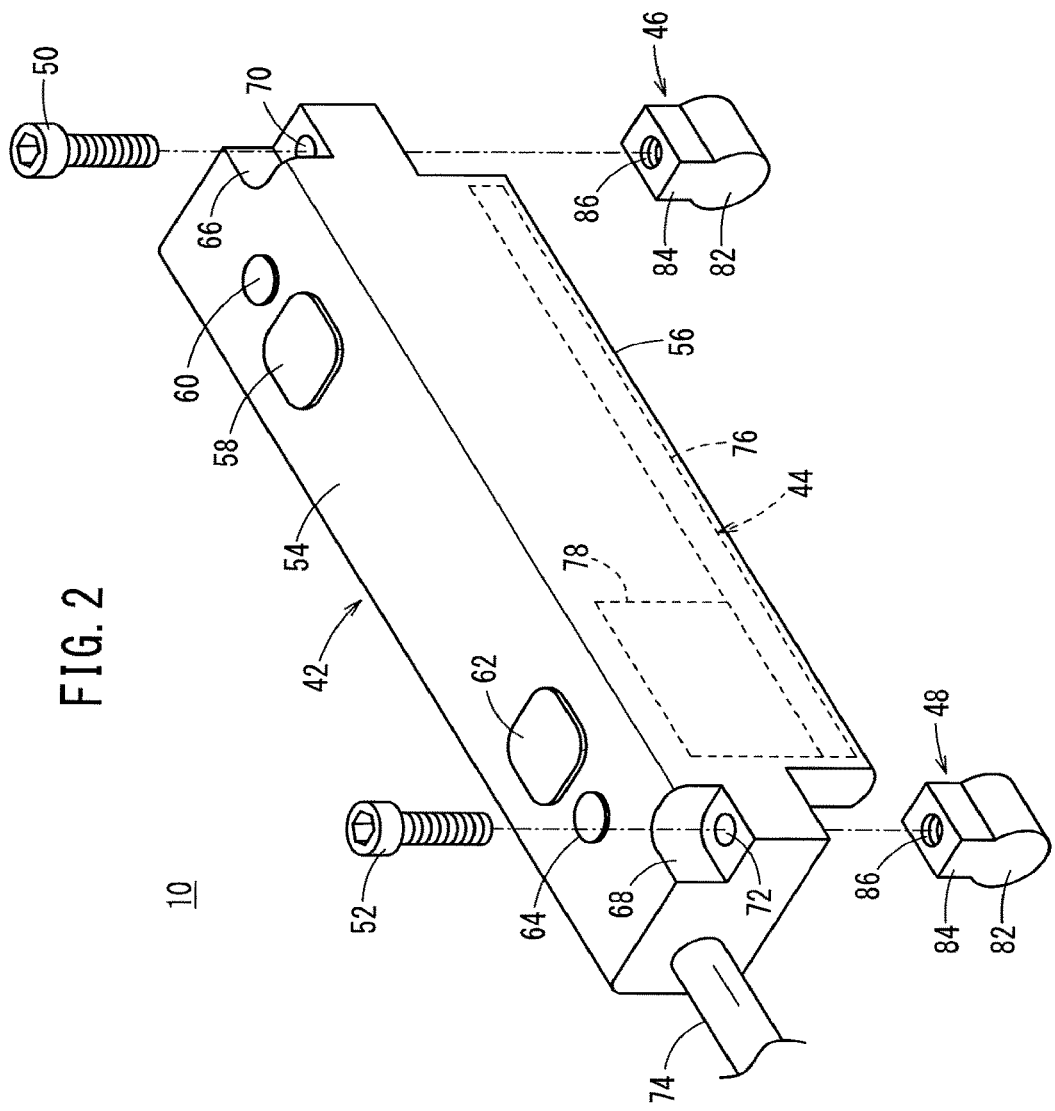
FIG. 2 is a perspective view of the position detecting sensor of FIG. 1.

Next, a description will be made concerning the structure of the position detecting sensor 10. As shown in FIG. 1, the position detecting sensor 10 is mounted and used in a sensor attachment groove 30 of the cylinder device 12. As shown in FIGS. 2 to 3B, the position detecting sensor 10 is equipped with an elongate housing 42, a sensor main body 44 accommodated in the housing 42, two mounting members 46, 48 which are inserted into the sensor attachment groove 30, and two connecting bolts (connecting members) 50, 52.

The housing 42 is formed integrally by a resin material, and includes a housing main body 54 formed with a substantially rectangular parallelepiped shape, and a sensor arrangement section 56 disposed on the housing main body 54. The housing main body 54 extends in one direction.

When the position detecting sensor 10 is mounted in the sensor attachment groove 30, on an outer surface of the housing main body 54 that is oriented on an opposite side from the cylinder tube 14, there are provided a first operating unit 58, a first display unit 60, a second operating unit 62, and a second display unit 64. The first operating unit 58 and the first display unit 60 are located on one end side of the housing main body 54, and the second operating unit 62 and the second display unit 64 are located on another end side of the housing main body 54.

Each of the first operating unit 58 and the second operating unit 62, respectively, serves to set positions of the piston that are desired to be detected, and is constituted by buttons (switches) which are capable of being operated by being pressed by the user. Each of the first display unit 60 and the second display unit 64 is constituted, for example, as an LED display.

On the outer side surface of the housing main body 54, two recesses 66, 68 are formed, which are formed by cutting out two corner portions mutually opposing in the longitudinal direction. Penetrating holes 70, 72, which extend in a thickness direction of the housing main body 54, are formed in bottom surfaces of the respective recesses 66, 68. The connecting bolt 50 that connects the housing main body 54 and the mounting member 46 is inserted through the penetrating hole 70, and the connecting bolt 52 that connects the housing main body 54 and the mounting member 48 is inserted through the penetrating hole 72. On one end surface of the housing main body 54, a lead line 74 is provided, which is connected electrically to the sensor main body 44.

The sensor arrangement section 56 is formed to project between the mounting member 46, which is connected to one end of the housing main body 54, and the mounting member 48, which is connected to another end of the housing main body 54, on the bottom surface of the housing main body 54. The sensor arrangement section 56 extends along the longitudinal direction of the housing main body 54.

A width dimension W1 of the sensor arrangement section 56 is set somewhat smaller than the groove width W2 of the narrow portion 34 of the sensor attachment groove 30, and a projecting length L1 of the sensor arrangement section 56 is set to be the same as the groove depth L2 or somewhat shorter than the groove depth L2 of the sensor attachment groove 30 (see FIGS. 3A, 3B and 4B). A side surface of the sensor arrangement section 56 and the side surface of the housing main body 54 are coplanar.

The sensor main body 44 includes a magnetic detector 76 that detects magnetism of the magnet installed on the piston, and a controller 78 in which circuitry of a signal processing system is incorporated (see FIGS. 2 through 3B). The magnetic detector 76 is accommodated on a distal end side of the sensor arrangement section 56, and includes a plurality of non-illustrated magnetic sensors therein. The magnetic detector 76 is formed to be slightly longer than the stroke length of the piston, in order to linearly detect a displacement condition of the piston, which is operated reciprocally, spanning from one end to the other end in the interior of the cylinder tube 14.

The controller 78 stores output signals from the magnetic detector 76 when the first operating unit 58 and the second operating unit 62 are operated. The controller 78 judges whether or not the piston is positioned at a first set position (e.g., a stopped position on one end side of the cylinder tube 14), which is set by operating the first operating unit 58 on the basis of the output signals from the magnetic detector 76. The controller 78 turns on the first display unit 60 if it is judged that the piston is located at the first set position, and turns off the first display unit 60 if it is judged that the piston is not located at the first set position.

The controller 78 also judges whether or not the piston is positioned at a second set position (e.g., a stopped position on another end side of the cylinder tube 14), which is set by operating the second operating unit 62 on the basis of the output signals from the magnetic detector 76. The controller 78 turns on the second display unit 64 if it is judged that the piston is located at the second set position, and turns off the second display unit 64 if it is judged that the piston is not located at the second set position.

As shown in FIGS. 2 through 4A, the mounting member 46 is constituted by a metallic material for preventing deformation of the mounting member 46. However, it is acceptable for the mounting member 46 to be formed by a resin material. The mounting member 46 includes a mounting member main body 82 formed with a circular shape in transverse cross section, and an extension 84 that extends in a straight line from the mounting member main body 82.

The mounting member main body 82 is constituted so as to be capable of being inserted into the wide portion 32 of the sensor attachment groove 30. A curvature of an outer surface of the mounting member main body 82 is set substantially the same as the curvature of the curved surface 36 of the wide portion 32. However, the curvature of the outer surface of the mounting member main body 82 may be set to be greater than the curvature of the curved surface 36 of the wide portion 32.

As shown in FIGS. 4A and 4B, a maximum width (diameter) W3 of the mounting member main body 82 is set to be greater than the groove width W2 of the narrow portion 34 of the sensor attachment groove 30. A total length (length along the direction in which the housing main body 54 extends) of the mounting member main body 82 is greater than the maximum width W3 of the mounting member main body 82.

The extension 84 is provided to span over the entire length of the mounting member main body 82. A width dimension W4 of the extension 84 is set to be substantially the same as the groove width W2 of the narrow portion 34 or slightly smaller than the groove width W2 of the narrow portion 34 of the sensor attachment groove 30. An extending length L3 of the extension 84 is set to be smaller than a groove depth L4 of the narrow portion 34. A threaded hole 86 with which the connecting bolt 50 is screw-engaged is formed in a distal end surface of the extension 84. The threaded hole 86 penetrates to the outer surface of the mounting member main body 82. The mounting member 48 is constituted in the same manner as the aforementioned mounting member 46, and therefore, detailed description of the mounting member 48 is omitted.

The position detecting sensor 10 according to the present embodiment is constructed basically as described above. Next, advantages and effects of the position detecting sensor 10 will be described.

First, as shown in FIG. 4A, the two mounting members 46, 48 are inserted into the interior of an arbitrary one of the sensor attachment grooves 30 from an end surface in the axial direction of the cylinder tube 14, and the mounting members 46, 48 are moved to predetermined positions along the sensor attachment groove 30.

At this time, the mounting member main body 82 is positioned in the wide portion 32, together with the extension 84 being positioned in the narrow portion 34. More specifically, the outer surface of the mounting member main body 82 is placed in contact with the curved surface 36 of the wide portion 32, whereas respective side walls of the extension 84 are placed in contact with the respective planar surfaces 38, 40 of the narrow portion 34.

In accordance therewith, the respective mounting members 46, 48 are suppressed from rotating about an axis parallel with the axis of the cylinder tube 14. Thus, the opening of the threaded hole 86 that opens on the distal end side of the extension 84 does not become oriented toward the wall surfaces (curved surface 36 and respective planar surfaces 38, 40) that make up the sensor attachment groove 30. Stated otherwise, the opening of the threaded hole 86 can reliably remain oriented toward the opening of the sensor attachment groove 30 of the side surface 14a of the cylinder tube 14.

However, if the respective side surfaces of the extension 84 are capable of contacting the respective planar surfaces 38, 40 of the narrow portion 34, a gap may be formed between the respective side surfaces of the extension 84 and the respective planar surfaces 38, 40 of the narrow portion 34. In this case as well, rotation of the respective mounting members 46, 48 can be suppressed.

Figure 5A:
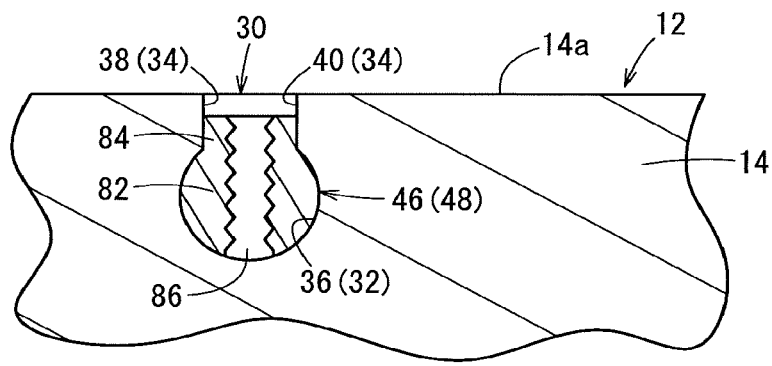
FIG. 5A is a first explanatory drawing of a mounting procedure for the position detecting sensor with respect to the cylinder device.
Figure 5B:
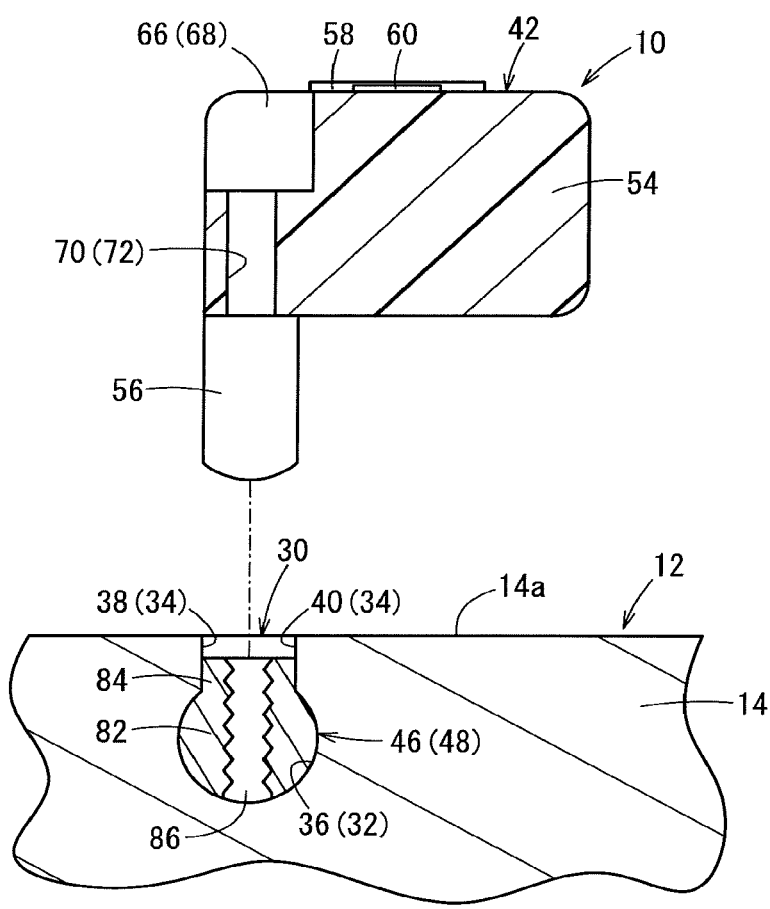
FIG. 5B is a second explanatory drawing of the mounting procedure.
Figure 6A:
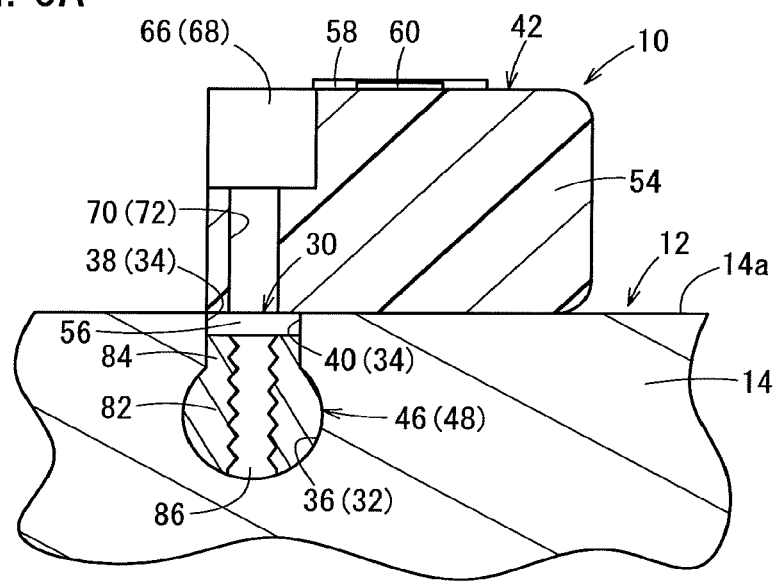
FIG. 6A is a third explanatory drawing of the mounting procedure.

Next, in a state in which the respective penetrating holes 70, 72 are aligned with the positions of the threaded holes 86 of the respective mounting members 46, 48, the sensor arrangement section 56 is inserted into the interior of the sensor attachment groove 30 from the side of a side surface 14a of the cylinder tube 14, such that the sensor arrangement section 56 is positioned between the mounting member 46 and the mounting member 48 (see FIG. 5B and FIG. 6A).

Figure 6B:
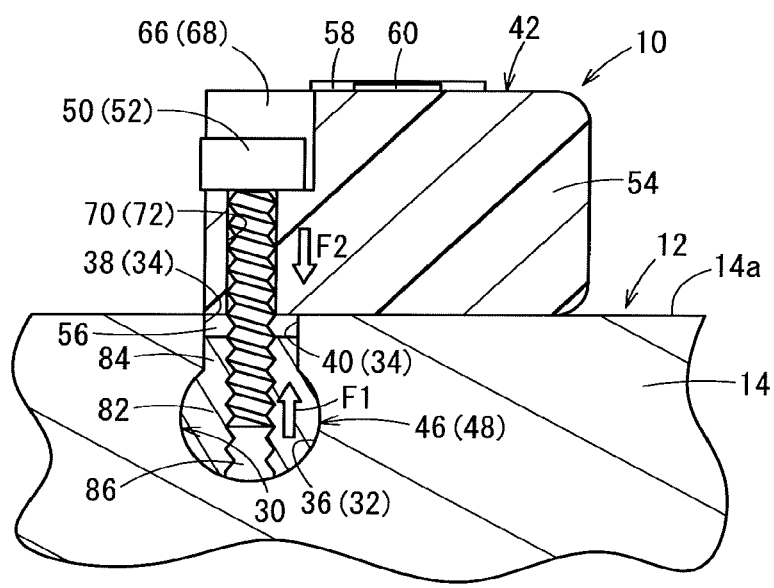
FIG. 6B is a fourth explanatory drawing of the mounting procedure.

Thereafter, using a non-illustrated tool such as a driver or the like, the connecting bolt 50 is passed through the penetrating hole 70 from the side of the recess 66 and is screw-engaged with the threaded hole 86 of the mounting member 46, and the connecting bolt 52 is passed through the penetrating hole 72 from the side of the recess 68 and is screw-engaged with the threaded hole 86 of the mounting member 48 (see FIG. 6B). Upon doing so, in each of the mounting members 46, 48, a tightening force F1 acts in a direction toward the housing main body 54, and in the housing main body 54, a tightening force F2 acts in a direction toward the respective mounting members 46, 48.

More specifically, the outer surface of the mounting member main body 82 is pressed by the tightening force F1 toward the side of the housing main body 54 with respect to the curved surface 36 of the wide portion 32, and together therewith, the bottom surface of the housing main body 54 is pressed by the tightening force F2 with respect to the side surface 14a of the cylinder tube 14. As a result, a portion of the cylinder tube 14 (at regions thereof having the planar surfaces 38, 40 of the narrow portion 34) is retained (sandwiched and gripped) between the mounting member main body 82 and the housing main body 54. Consequently, attachment of the position detecting sensor 10 on the cylinder device 12 is completed.

In this state, a distal end surface of the sensor arrangement section 56 is placed in contact with the curved surface 36 of the sensor attachment groove 30. More specifically, the magnetic detector 76 is positioned in the interior of the sensor attachment groove 30. Accordingly, since the distance between the magnetic detector 76 and the piston (magnet thereof) can be relatively close, the detection accuracy of the position detecting sensor 10 can be enhanced.

According to the present embodiment, in a state in which the housing 42 and the mounting members 46, 48 are not connected by the connecting bolts 50, 52, the mounting members 46, 48 can be inserted into the interior of the sensor attachment groove 30 from an end surface in the axial direction of the cylinder tube 14, and moved to a predetermined position along the sensor attachment groove 30. At this time, since the mounting member main body 82 is positioned in the wide portion 32 together with the extension 84 being positioned in the narrow portion 34, the mounting members 46, 48 can be prevented from rotating inside the sensor attachment groove 30 about an axis parallel with the axis of the cylinder tube 14.

Thereafter, the housing 42 and the respective mounting members 46, 48 are connected together using the respective connecting bolts 50, 52, whereby a portion of the cylinder tube 14 is retained between the housing main body 54 and the mounting members 46, 48. In accordance therewith, the position detecting sensor 10 can be mounted easily and efficiently with respect to the cylinder device 12, even in the case that only a comparatively narrow and small operating space is available in the vicinity of an end in the axial direction of the cylinder tube 14.

According to the present embodiment, the connecting bolts 50, 52 are inserted through the penetrating holes 70, 72 and are screw-engaged with the threaded holes 86 of the extensions 84 of the mounting members 46, 48, and therefore, the portion of the cylinder tube 14 can easily be retained between the mounting member main body 82 and the housing main body 54.

Further, with the present embodiment, since the mounting members 46, 48 are mounted respectively on both ends of the housing main body 54, floating up of one end of the housing main body 54 from the side surface 14a of the cylinder tube 14 can be suppressed. Accordingly, the position detecting sensor 10 can be fixed reliably and stably with respect to the cylinder tube 14.

According to the present embodiment, since the sensor arrangement section 56 is positioned between the two mounting members 46, 48, the sensor arrangement section 56 (magnetic detector 76) can be fixed reliably and stably with respect to the cylinder device 12.

The position detecting sensor 10 according to the present embodiment is not limited to the configuration described above. Each of the mounting member main body 82 and the wide portion 32 may be formed with rectangular shapes as viewed in transverse cross section. In accordance with such a structure as well, the same advantages and effects as those discussed previously can be accomplished.

The position detecting sensor according to the present invention is not limited to the embodiment described above, and it is a matter of course that various modified or additional configurations could be adopted therein without departing from the essential scope of the present invention. For example, although according to the present embodiment, a cylinder device using a pressure fluid has been exemplified as the actuator, the invention is not limited to such a cylinder device, and an electric actuator can also be used. Further, the principles of the invention can also be applied to a linear guide.

What is claimed is:

1. A position detecting sensor mounted in a sensor attachment groove that opens on a side surface of an actuator and extends along an axial direction to at least one end surface of the actuator, the sensor attachment groove including a wide portion on a groove bottom surface side, and a narrow portion on a side surface side of the actuator, the position detecting sensor comprising:
   a housing in which there is accommodated a sensor main body that detects a position of a displaceable body of the actuator, the sensor main body configured to be inserted into the sensor attachment groove and includes a magnetic field sensor;
   a mounting member configured to be inserted into the sensor attachment groove; and
   a connecting member that connects the housing and the mounting member;
   wherein the mounting member includes:
   a mounting member main body positioned in the wide portion, and having a width dimension larger than a groove width of the narrow portion; and
   an extension extending from the mounting member main body and positioned in the narrow portion;

wherein the housing and the mounting member are connected by the connecting member, whereby a portion of the actuator is retained between the housing and the mounting member.

2. The position detecting sensor according to claim 1, wherein:
the connecting member is a bolt;
a penetrating hole through which the connecting member is inserted is formed in the housing; and
a threaded hole with which the connecting member is screw-engaged is formed in the extension.

3. The position detecting sensor according to claim 1, wherein the wide portion and the mounting member main body, respectively, are formed with circular shapes as viewed in transverse cross section.

4. The position detecting sensor according to claim 1, wherein:
the housing extends in one direction;
the position detecting sensor includes two each of the mounting members and two each of the connecting members; and
the respective mounting members are connected respectively by the connecting members to opposite ends in the longitudinal direction of the housing.

5. The position detecting sensor according to claim 4, wherein the housing comprises:
a housing main body; and
a sensor arrangement section provided on the housing main body at a position between the two mounting members, and in which the sensor main body is arranged;
wherein the sensor arrangement section is foiled to be insertable into the interior of the sensor attachment groove from the side surface side of the actuator, so that the sensor main body is positioned inside the sensor attachment groove.

6. The position detecting sensor according to claim 1, wherein the housing includes a sensor arrangement section which accommodates the sensor main body and an axial end face of the sensor arrangement section faces the mounting member.

* * * * *